United States Patent
Kawabe et al.

(10) Patent No.: US 8,258,227 B2
(45) Date of Patent: Sep. 4, 2012

(54) LAMINATING RESIN COMPOSITION AND MULTILAYER STRUCTURE

(75) Inventors: Kuniaki Kawabe, Ichihara (JP); Hirotaka Uosaki, Ichihara (JP); Motoyasu Yasui, Chiba (JP); Hideo Nakamura, Narashino (JP); Yasushi Amada, Koga (JP); Akihito Ohga, Otsu (JP)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 12/745,245

(22) PCT Filed: Nov. 25, 2008

(86) PCT No.: PCT/JP2008/071349
§ 371 (c)(1),
(2), (4) Date: May 27, 2010

(87) PCT Pub. No.: WO2009/069595
PCT Pub. Date: Jun. 4, 2009

(65) Prior Publication Data
US 2010/0286326 A1    Nov. 11, 2010

(30) Foreign Application Priority Data
Nov. 28, 2007 (JP) .................... 2007-307188

(51) Int. Cl.
*C08K 5/01* (2006.01)
*C08F 210/00* (2006.01)
(52) U.S. Cl. ........................ 524/487; 526/348
(58) Field of Classification Search ................ 524/487
See application file for complete search history.

(56) References Cited

U.S. PATENT DOCUMENTS

| | | | |
|---|---|---|---|
| 5,336,746 A * | 8/1994 | Tsutsui et al. | 526/348.6 |
| 6,313,226 B1 * | 11/2001 | Yasaka et al. | 525/240 |
| 7,192,909 B2 | 3/2007 | Richter et al. | |
| 2007/0117905 A1 * | 5/2007 | Toyoda et al. | 524/487 |
| 2009/0127751 A1 * | 5/2009 | Uosaki et al. | 264/572 |
| 2009/0137729 A1 | 5/2009 | Uosaki et al. | |
| 2009/0166911 A1 | 7/2009 | Uosaki et al. | |

FOREIGN PATENT DOCUMENTS

| | | |
|---|---|---|
| EP | 2 002 955 A2 | 12/2008 |
| EP | 2 006 071 A2 | 12/2008 |
| EP | 2 006 072 A1 | 12/2008 |
| JP | 05-080492 | 11/1993 |
| JP | 2001-072811 A | 3/2001 |
| JP | 2003-073511 A | 3/2003 |
| JP | 2003-528948 | 9/2003 |
| JP | 2004-059867 A | 2/2004 |
| JP | 2005-281449 | 10/2005 |
| JP | 2007-237654 A | 9/2007 |
| JP | 2007-270032 A | 10/2007 |
| WO | WO-2007/105483 A1 | 9/2007 |
| WO | WO-2007/111249 A1 | 10/2007 |
| WO | WO-2007/114009 A1 | 10/2007 |
| WO | WO-2007/114102 A1 | 10/2007 |
| WO | WO-2007/122906 A1 | 11/2007 |

OTHER PUBLICATIONS

International Search Report for International Application No. PCT/JP2008/071349, mail date Feb. 24, 2009, 2 pages.
Communication (Supplementary EP Search Report) in EP Appln No. 08 85 4352 dated May 27, 2011.

* cited by examiner

*Primary Examiner* — Hui Chin
(74) *Attorney, Agent, or Firm* — Foley & Lardner LLP

(57) ABSTRACT

Laminating resin compositions of the invention enable excellent productivity in the lamination processes, and are free from deterioration in optical characteristics such as transparency or surface properties inherent to resins such as polypropylenes. Multilayer structures obtained by laminating the composition on a substrate have tear strength which is as high as that of multilayer structures obtained by simply laminating a polyolefin resin such as polypropylene on a substrate. The laminating resin composition includes a polyolefin resin and a polyethylene wax having a density in the range of 890 to 955 $kg/m^3$ as measured by a density gradient tube method in accordance with JIS K 7112 and a number average molecular weight (Mn) in terms of polyethylene in the range of 500 to 2900 as measured by gel permeation chromatography (GPC).

10 Claims, No Drawings

LAMINATING RESIN COMPOSITION AND MULTILAYER STRUCTURE

FIELD OF THE INVENTION

The present invention relates to laminating synthetic resin compositions that are laminated on substrates, and multilayer structures that have a laminate layer formed from the composition.

BACKGROUND OF THE INVENTION

It is a conventional practice to provide laminate layers on the surface of substrates produced from materials such as metals, paper, wood materials and plastics for the purpose of surface protection or surface modification. Polypropylenes, which have good transparency, chemical resistance and heat resistance, are excellent laminating materials for the production of laminate layers. For example, Patent Document 1 discloses that a polypropylene is blended with a high-pressure low-density polyethylene and an amorphous α-olefin copolymer to minimize the deterioration in forming properties such as uneven thickness known as a surge while achieving higher transparency.

Meanwhile, there has been a greater demand for improved productivity in the lamination processes. The addition of forming auxiliaries is a known approach to improve the productivity. For example, forming auxiliaries such as oils and polyethylene waxes are blended with thermoplastic resins that are shaped (Patent Documents 2 and 3).

Conventional forming auxiliaries tend to improve the productivity in the lamination of resins such as polypropylenes. However, the obtainable laminate layers show lowered adhesion to substrates and lowered tear strength. Furthermore, optical characteristics such as transparency or surface properties inherent to the resins such as polypropylenes tend to be deteriorated.

Patent Document 1: JP-A-2001-72811
Patent Document 2: JP-B-H05-80492
Patent Document 3: JP-A-2003-528948

SUMMARY OF THE INVENTION

It is an object of the present invention to provide laminating resin compositions which enable excellent productivity in the lamination processes, are free from deterioration in optical characteristics or surface properties inherent to resins such as polypropylenes, and allow for the production of multilayer structures having tear strength as high as that of multilayer structures obtained by simply laminating a polyolefin resin such as polypropylene on a substrate. It is another object of the invention to provide multilayer structures that have a laminate layer formed from the composition.

The present inventors studied diligently to achieve the above objects. They have then found that laminating resin compositions containing a polyolefin resin and a specific polyethylene wax enable excellent productivity in the production of multilayer structures, are free from deterioration in properties inherent to polyolefin resins, and allow for excellent tear strength of the multilayer structures compared to multilayer structures obtained by simply laminating a polyolefin resin such as polypropylene on a substrate. The present invention has been completed based on the finding.

A laminating resin composition according to the present invention comprises a polyolefin resin and a polyethylene wax that has a density in the range of 890 to 955 kg/m$^3$ as measured by a density gradient tube method in accordance with JIS K 7112 and a number average molecular weight (Mn) in terms of polyethylene in the range of 500 to 2900 as measured by gel permeation chromatography (GPC).

In a preferred embodiment, the polyolefin resin comprises a polypropylene that is a random copolymer of propylene and an α-olefin (other than propylene) and contains 0.1 to 10 mol % of structural units derived from the α-olefin (wherein the total of all structural units is 100 mol %).

In another preferred embodiment, the polyolefin resin further comprises at least one resin selected from the group consisting of low-density polyethylenes and amorphous α-olefin copolymers (other than the polypropylenes and the low-density polyethylenes) wherein the low-density polyethylenes have a density in the range of 900 to 940 kg/m$^3$ and a melt flow rate (MFR) in the range of 3 to 12 g/10 min as measured at 190° C. under 2.16 kg load in accordance with ASTM D-1238.

The amorphous α-olefin copolymers preferably contain structural units derived from ethylene and structural units derived from a α-olefin of 3 to 10 carbon atoms, and have a content of the ethylene-derived structural units ranging from 75 to 95 mol % (wherein the total of all structural units is 100 mol %) and a density of 850 to 890 kg/m$^3$.

The amorphous α-olefin copolymers preferably contain structural units derived from propylene and structural units derived from an α-olefin of 2 or 4 to 10 carbon atoms, and have a content of the propylene-derived structural units ranging from 70 to less than 90 mol % (wherein the total of all structural units is 100 mol %).

The resin composition preferably contains the polyethylene wax at 0.01 to 10 parts by weight based on 100 parts by weight of the polyolefin resin.

The polyethylene wax preferably satisfies the relation expressed by Equation (I) below:

$$A \leq 230 \times K^{(-0.537)} \qquad (I)$$

wherein A is the content (wt %) of a component in the polyethylene wax which has a molecular weight in terms of polyethylene of not more than 1,000 as measured by gel permeation chromatography, and K is the melt viscosity (mPa·s) of the polyethylene wax at 140° C.

The polyethylene wax preferably satisfies the relation expressed by Equation (II) below:

$$B \leq 0.0075 \times K \qquad (II)$$

wherein B is the content (%) of a component in the polyethylene wax which has a molecular weight in terms of polyethylene of not less than 20,000 as measured by gel permeation chromatography, and K is the melt viscosity (mPa·s) of the polyethylene wax at 140° C.

A multilayer structure according to the present invention comprises a layer comprising a substrate and a laminate layer comprising the resin composition.

ADVANTAGEOUS EFFECTS OF THE INVENTION

The laminating resin compositions of the invention enable excellent productivity in the lamination processes, are free from deterioration in transparency or surface properties inherent to resins such as polypropylenes, and allow for tear strength of the multilayer structures which is as high as that of multilayer structures obtained by simply laminating a polyolefin resin such as polypropylene on a substrate. The multilayer structures of the invention have a laminate layer formed from the composition.

PREFERRED EMBODIMENTS FOR CARRYING OUT THE INVENTION

The present invention will be described in detail hereinbelow.

A laminating resin composition according to the present invention comprises a polyolefin resin and a polyethylene wax that has a density in the range of 890 to 955 kg/m$^3$ as measured by a density gradient tube method in accordance with JIS K 7112 and a number average molecular weight (Mn) in terms of polyethylene in the range of 500 to 2900 as measured by gel permeation chromatography (GPC).

[Polyolefin Resins]

Examples of the polyolefin resins used in the laminating resin compositions include polyolefin resins usually used in lamination processes such as polypropylenes, polyethylenes and blends of these resins. In particular, the polyolefin resins preferably include a polypropylene, and more preferably a polypropylene that is a random copolymer of propylene and an α-olefin (other than propylene) and contains 0.1 to 10 mol % of structural units derived from the α-olefin (wherein the total of all structural units is 100 mol %).

In an embodiment, the polyolefin resins may include a polypropylene that is a random copolymer of propylene and an α-olefin (other than propylene) and contains 0.1 to 10 mol % of structural units derived from the α-olefin (wherein the total of all structural units is 100 mol %), and at least one resin selected from the group consisting of low-density polyethylenes and amorphous α-olefin copolymers (other than the polypropylenes and the low-density polyethylenes) wherein the low-density polyethylenes have a density in the range of 900 to 940 kg/m$^3$ and a melt flow rate (MFR) in the range of 3 to 12 g/10 min as measured at 190° C. under 2.16 kg load in accordance with ASTM D-1238.

The polypropylene may be used singly as the polyolefin resin in the invention. When the polypropylene and at least one resin selected from the low-density polyethylenes and the amorphous α-olefin copolymers are used as the polyolefin resins, the polypropylene usually accounts for 75 to 95 wt %, preferably 80 to 90 wt %, and the at least one resin selected from the low-density polyethylenes and the amorphous α-olefin copolymers accounts for 5 to 25 wt %, preferably 10 to 20 wt % relative to 100 wt % of the polyolefin resins.

The above proportions of the polyolefin resins ensure that the polyolefin resins show good compatibility with polyethylene waxes and the productivity of the laminating resin compositions that are laminated is improved.

[Polypropylenes]

The polypropylenes may be general polypropylenes. A particularly preferred polypropylene is a random copolymer of propylene and an α-olefin (other than propylene) which contains 0.1 to 10 mol % of structural units derived from the α-olefin (wherein the total of all structural units is 100 mol %). The polypropylene more preferably contains the structural units derived from the α-olefin at 0.5 to 7 mol % (wherein the total of all structural units is 100 mol %).

Examples of the α-olefins include α-olefins of 2 to 20 carbon atoms except propylene, such as ethylene, 1-butene, 1-pentene, 1-hexene, 4-methyl-1-pentene, 1-octene and 1-decene. These α-olefins may be used singly, or two or more kinds may be used in combination. In particular, ethylene and 1-butene are preferable.

The polypropylenes may be produced using stereospecific olefin polymerization catalysts such as Ziegler-Natta catalysts and metallocene catalysts.

The polypropylenes usually have a melt flow rate (MFR) of 15 to 40 g/10 min, and preferably 20 to 30 g/10 min as measured at 230° C. under 2.16 kg load in accordance with ASTM D-1238.

This MFR ensures that the obtainable laminating resin composition shows good laminating properties and the obtainable multilayer structure has excellent mechanical strength such as tensile strength.

[Low-Density Polyethylenes]

The low-density polyethylenes are not particularly limited as long as the polyethylenes have a density in the range of 900 to 940 (kg/m$^3$) and a melt flow rate (MFR) in the range of 3 to 12 g/10 min as measured at 190° C. under 2.16 kg load in accordance with ASTM D-1238. Examples include low-density polyethylenes, medium-density polyethylenes, linear low-density polyethylenes, ultra low-density polyethylenes and blends of these polyethylenes. The polyethylenes increase the melt tension of the laminating resin compositions in molten state and provide good laminating properties.

[Amorphous α-Olefin Copolymers]

The amorphous α-olefin copolymers are not particularly limited as long as the copolymers contain structural units derived from two or more kinds of α-olefins and are amorphous. The amorphous α-olefin copolymers exclude the aforementioned polypropylenes that are random copolymers of propylene and an α-olefin (other than propylene) which contain 0.1 to 10 mol % of structural units derived from the α-olefin (wherein the total of all structural units is 100 mol %) and the above low-density polyethylenes having a density in the range of 900 to 940 kg/m$^3$ and a melt flow rate (MFR) in the range of 3 to 12 g/10 min as measured at 190° C. under 2.16 kg load in accordance with ASTM D-1238. The amorphous α-olefin copolymers generally contain structural units derived from two or more kinds of α-olefins of 2 to 10 carbon atoms and have rubber-like properties.

Typical examples of the amorphous α-olefin copolymers are polymers that contain ethylene or propylene as a main component and one, two or more kinds of other α-olefins of 2 to 10 carbon atoms as secondary main components, and optionally contain small amounts of units from diene monomers as required.

The ethylene-based amorphous α-olefin copolymers contain structural units derived from ethylene and structural units derived from a α-olefin of 3 to 10 carbon atoms wherein the content of the ethylene-derived structural units is preferably 75 to 95 mol %, and more preferably 75 to 90 mol % (based on the total of all structural units at 100 mol %). The content of the structural units from α-olefins of 3 to 10 carbon atoms is preferably 5 to 25 mol %, and more preferably 10 to 25 mol % (based on the total of all structural units at 100 mol %). The copolymers may contain structural units derived from diene monomers as required. When the structural units from diene monomers are present, the content thereof is not more than 2 mol %, and preferably not more than 1 mol % (based on the total of all structural units at 100 mol %). Examples of the ethylene-based amorphous α-olefin copolymers include ethylene/propylene copolymers, ethylene/1-butene copolymers, ethylene/4-methyl-1-pentene copolymers, ethylene/1-hexene copolymers, ethylene/1-octene copolymers, ethylene/propylene/dicyclopentadiene copolymers, ethylene/propylene/5-ethylidene-2-norbornene copolymers and ethylene/propylene/1,6-hexadiene copolymers. Of these, ethylene/propylene copolymers and ethylene/1-butene copolymers are particularly preferred. The ethylene-based amorphous α-olefin copolymers preferably have a density in the range of 850 to 890 kg/m$^3$.

The propylene-based amorphous α-olefin copolymers contain structural units derived from propylene and structural units derived from an α-olefin of 2 or 4 to 10 carbon atoms wherein the content of the propylene-derived structural units is preferably 70 mol % to less than 90 mol %, and more preferably 72 mol % to less than 90 mol % (based on the total of all structural units at 100 mol %). The content of the structural units from α-olefins of 2 or 4 to 10 carbon atoms is preferably above 10 mol % to not more than 30 mol %, and more preferably above 10 mol % to not more than 28 mol % (based on the total of all structural units at 100 mol %). Examples of the propylene-based amorphous α-olefin copolymers include propylene/ethylene copolymers and propylene/1-butene copolymers.

The amorphous α-olefin copolymers have a melt flow rate (MFR) in the range of 0.1 to 30 g/10 min, and preferably 0.5 to 20 g/10 min as measured at 230° C. under 2.16 kg load in accordance with ASTM D-1238.

This MFR ensures that the obtainable laminating resin composition shows a high melt tension in molten state and forms a laminate layer in uniform thickness in the production of multilayer structures while surges are effectively prevented in the obtainable multilayer structures.

[Polyethylene Waxes]

The polyethylene waxes in the invention have a density in the range of 890 to 955 kg/m$^3$ as measured by a density gradient tube method in accordance with JIS K 7112 and a number average molecular weight (Mn) in terms of polyethylene in the range of 500 to 2,900 as measured by gel permeation chromatography (GPC). Examples of the polyethylene waxes include ethylene homopolymers, ethylene/α-olefin copolymers and blends of these polymers. The number average molecular weight (Mn) of the polyethylene waxes in terms of polyethylene is measured by gel permeation chromatography (GPC) under the following conditions.

(Number Average Molecular Weight (Mn))

The number average molecular weight was determined by GPC under the following conditions. A calibration curve was prepared using commercially available monodisperse polystyrene standards, and the number average molecular weight was obtained by a conversion method as described below.

Chromatograph: Gel permeation chromatograph Alliance GPC 2000 (manufactured by Waters)

Solvent: o-dichlorobenzene

Columns: two TSK gel GMH$_6$-HT columns+two TSK gel GMH$_6$-HTL columns (each manufactured by TOSOH CORPORATION)

Flow rate: 1.0 ml/min

Sample: 0.15 mg/ml o-dichlorobenzene solution

Injection amount: 500 μl.

Detector: differential refractometer

Temperature: 140° C.

Molecular weight conversion: in terms of PE/general calibration method

In the general calibration method, the following Mark-Houwink coefficients were used:

Coefficient for polystyrene(PS):$KPS=1.38 \times 10^{-4}$, $aPS=0.70$

Coefficient for polyethylene(PE):$KPE=5.06 \times 10^{-4}$, $aPE=0.70$

The polyethylene waxes used in the invention have a density in the range of 890 to 955 kg/m$^3$. The density of the polyethylene waxes is measured by a density gradient tube method in accordance with JIS K 7112.

The polyethylene wax preferably has a number average molecular weight (Mn) of 600 to 2,500 and a density of 895 to 950 kg/m$^3$. When the polyethylene wax has a number average molecular weight (Mn) and a density in these preferred ranges, excellent productivity is achieved in the production of laminate layers and the obtainable multilayer structures tend to be free from deterioration in tear strength while maintaining optical characteristics and surface properties of the laminate layers.

The number average molecular weight (Mn) of the polyethylene waxes may be controlled by, for example, polymerization temperature. When the polyethylene wax is produced using a metallocene catalyst as described later, the polymerization temperature is usually in the range of 100 to 200° C. In order to achieve Mn in the above preferred range, the polymerization temperature in the production of the polyethylene wax is preferably in the range of 100 to 180° C., and more preferably 100 to 170° C.

In the case where the polyethylene wax is an ethylene homopolymer, the density of the polyethylene wax is dependent on the number average molecular weight (Mn) of the polyethylene wax. For example, the density of the polyethylene wax can be controlled at a low level by lowering the molecular weight of the polyethylene wax. In the case where the polyethylene wax is an ethylene/α-olefin copolymer, the density of the polyethylene wax depends on the number average molecular weight (Mn) and is also controllable by adjusting the amount of α-olefins relative to the amount of ethylene and by selecting the kinds of α-olefins. For example, increasing the amount of α-olefins relative to ethylene can reduce the density of the obtainable polyethylene wax.

From the viewpoint of density, preferred polyethylene waxes are ethylene homopolymers, ethylene/α-olefin of 3 to 20 carbon atoms copolymers and mixtures of these polymers. The α-olefins in the ethylene/α-olefin of 3 to 20 carbon atoms copolymers are preferably α-olefins of 3 to 10 carbon atoms, with propylene, 1-butene, 1-pentene, 1-hexene, 4-methyl-1-pentene and 1-octene being more preferable, and propylene, 1-butene, 1-hexene and 4-methyl-1-pentene being particularly preferable.

In the production of the ethylene/α-olefin copolymers, the α-olefins are preferably used in amounts of 0 to 20 mol %, more preferably 0.1 to 15 mol %, and still more preferably 0.1 to 10 mol % relative to all the monomers used.

The density of the polyethylene waxes is also controllable by polymerization temperature. When the polyethylene wax is produced using a metallocene catalyst as described later, the polymerization temperature is usually in the range of 100 to 200° C. In order to achieve a density in the above preferred range, the polymerization temperature in the production of the polyethylene wax is preferably in the range of 100 to 180° C., and more preferably 100 to 170° C.

In the polyethylene waxes used in the invention, the molecular weight and the melt viscosity preferably satisfy the specific relation expressed by Equation (I) below:

$$A \leq 230 \times K^{(-0.537)} \qquad (I)$$

wherein A is the content in terms of weight (wt %) of a component in the polyethylene wax which has a molecular weight in terms of polyethylene of not more than 1,000 as measured by gel permeation chromatography, and K is the melt viscosity (mPa·s) of the polyethylene wax at 140° C.

When the polyethylene wax satisfies the relation of Equation (I), the obtainable multilayer structure having the laminate layer tends to be free from deterioration in tear strength.

As described hereinabove, when a polypropylene resin is mixed with a polyethylene wax having a low melt viscosity, the mixture shows a lowered viscosity and tends to achieve improved productivity in the laminating process. Although the productivity may be improved, the obtainable shaped products are often deteriorated in mechanical properties inherent to the polypropylene.

The present inventors have studied mechanical properties of laminated multilayer structures having laminate layers and have found that the proportion of a component in the polyethylene wax having a molecular weight of not more than 1,000 is very important in relation to the melt viscosity. Although a detailed mechanism is not clear, it is assumed that in the production of multilayer structures which have a laminate layer formed of a polyethylene wax and a polypropylene resin, mechanical properties of the final multilayer structures having the laminate layer are lowered if the polyethylene wax contains more than a certain proportion of a component having a molecular weight of not more than 1,000.

The polyethylene wax having a content A in the above range may be obtained by directly polymerizing an olefin using a known catalyst, for example a magnesium-supported titanium catalyst. Alternatively, the polyethylene wax may be produced by thermally decomposing a high molecular weight polyolefin or by refining olefin polymers through solvent fractionation utilizing differing solubilities in solvents or through molecular distillation utilizing differing boiling points. A polyethylene wax prepared using a metallocene catalyst is preferable. Preferred metallocene catalysts will be described later.

The content A is also controllable by polymerization temperature. When the polyethylene wax is produced using a metallocene catalyst as described later, the polymerization temperature is usually in the range of 100 to 200° C. In order to achieve a content A in the above range, the polymerization temperature in the production of the polyethylene wax is preferably in the range of 100 to 180° C., and more preferably 100 to 170° C.

In the polyethylene waxes, the molecular weight and the melt viscosity preferably satisfy the specific relation expressed by Equation (II) below:

$$B \leq 0.0075 \times K \quad \text{(II)}$$

wherein B is the content in terms of weight (wt %) of a component in the polyethylene wax which has a molecular weight in terms of polyethylene of not less than 20,000 as measured by gel permeation chromatography, and K is the melt viscosity (mPa·s) of the polyethylene wax measured with a Brookfield (B type) viscometer at 140° C.

When the polyethylene wax satisfies the relation of Equation (II), the obtainable multilayer structure having the laminate layer tends to be free from deterioration in tear strength.

In general, when a polypropylene resin is mixed with a polyethylene wax having a low melt viscosity, the mixture shows a lowered viscosity and tends to achieve improved productivity in the shaping process. Although the productivity may be improved, the obtainable shaped products are often not satisfactory in mechanical properties.

The present inventors have studied mechanical properties of laminated multilayer structures and have found that the proportion of a component in the polyethylene wax having a molecular weight of not less than 20,000 is very important in relation to the melt viscosity. Although a detailed mechanism is not clear, it is assumed that a component in the polyethylene wax having a molecular weight of not less than 20,000 shows a specific melting behavior when the polyethylene wax and the polypropylene resin are melt-kneaded together; and from the viewpoint of melt viscosity of the entire polyethylene wax, the polyethylene wax cannot be favorably dispersed in the polypropylene if the polyethylene wax contains more than a certain proportion of a component having a molecular weight of not less than 20,000, and mechanical properties of the final products are consequently affected.

The polyethylene wax having a content B in the above range may be obtained by directly polymerizing an olefin using a known catalyst, for example a magnesium-supported titanium catalyst. Alternatively, the polyethylene wax may be produced by thermally decomposing a high molecular weight polyolefin or by refining olefin polymers through solvent fractionation utilizing differing solubilities in solvents or through molecular distillation utilizing differing boiling points. A polyethylene wax prepared using a metallocene catalyst is preferable. Preferred metallocene catalysts will be described later.

The content B is also controllable by polymerization temperature. When the polyethylene wax is produced using a metallocene catalyst as described later, the polymerization temperature is usually in the range of 100 to 200° C. In order to achieve a content B in the above range, the polymerization temperature in the production of the polyethylene wax is preferably in the range of 100 to 180° C., and more preferably 100 to 170° C.

The polyethylene wax is solid at normal temperature and becomes a low-viscosity liquid at 65 to 130° C.

In the polyethylene waxes, the crystallization temperature [Tc (° C.)] measured with a differential scanning calorimeter (DSC) and the density (D ($kg/m^3$)) measured by a density gradient tube method preferably satisfy Equation (III), more preferably Equation (IIIa), and still more preferably Equation (IIIb).

$$0.501 \times D - 366 \geq Tc \quad \text{(III)}$$

$$0.501 \times D - 366.5 \geq Tc \quad \text{(IIIa)}$$

$$0.501 \times D - 367 \geq Tc \quad \text{(IIIb)}$$

When the crystallization temperature (Tc) and the density (D) of the polyethylene wax satisfy the above relation, the polyethylene wax tends to show good dispersibility in the polypropylene.

The polyethylene wax satisfying the above relation may be obtained by directly polymerizing an olefin using a known catalyst, for example a magnesium-supported titanium catalyst. Alternatively, the polyethylene wax may be produced by thermally decomposing a high molecular weight polyolefin or by refining olefin polymers through solvent fractionation utilizing differing solubilities in solvents or through molecular distillation utilizing differing boiling points. A polyethylene wax prepared using a metallocene catalyst is preferable. Preferred metallocene catalysts will be described later.

The polyethylene wax satisfying the above relation may be also obtained by controlling the polymerization temperature. When the polyethylene wax is produced using a metallocene catalyst as described later, the polymerization temperature is usually in the range of 100 to 200° C. In order to produce the polyethylene wax satisfying the content B, the polymerization temperature is preferably in the range of 100 to 180° C., and more preferably 100 to 170° C.

Preferred examples of the metallocene catalysts for use in the invention include olefin polymerization catalysts that are comprised of (A) a Group 4 transition metal metallocene compound, and at least one compound (B) selected from (b-1) organoaluminum oxy-compounds, (b-2) compounds capable of reacting with the bridged metallocene compound (A) to form an ion pair and (b-3) organoaluminum compounds, as disclosed in PCT application international publications WO/2007/114102, WO/2007/105483, WO/2007/114009 and WO/2007/122906.

Specific examples of the Group 4 transition metal metallocene compounds (A) include bis(cyclopentadienyl)zirconium monochloride monohydride, bis(cyclopentadienyl)zirconium dichloride, bis(1-methyl-3-butylcyclopentadienyl) zirconium bis(trifluoromethanesulfonate) and bis(1,3-dimethylcyclopentadienyl)zirconium dichloride.

Specific examples of the at least one compound (B) selected from (b-1) organoaluminum oxy-compounds, (b-2) compounds capable of reacting with the bridged metallocene compound (A) to form an ion pair and (b-3) organoaluminum compounds include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, trimethylaluminum and triisobutylaluminum.

<Polymerization>

The polyolefin wax for use in the invention may be obtained by homopolymerizing ethylene or copolymerizing ethylene and an α-olefin in the presence of the above metallocene catalyst. The polymerization is usually performed in liquid phase. In the polymerization, the catalyst components may be used or added in any manner or order without limitation. Exemplary methods are described below.

[q1] The component (A) alone is added to a polymerizer.

[q2] The component (A) and the component (B) are added to a polymerizer in any order.

In the method [q2], at least two or more components of the catalyst components may be brought into contact with each other beforehand. A hydrocarbon solvent is usually used for the contacting, but the α-olefin may be used as solvent. The monomers used herein are as described hereinabove.

The polymerization may be performed by a suspension polymerization process in which the polyolefin wax is obtained as particles suspended in a solvent such as hexane, a gas phase polymerization process without a solvent, or a solution polymerization process in which the polyolefin wax is obtained as a solution in a solvent or in the molten state without a solvent at a polymerization temperature of not less than 140° C. From the viewpoints of economic efficiency and quality, the solution polymerization is preferable.

The polymerization may be carried out batchwise or continuously. In the case of batchwise polymerization, the catalyst components are used in concentrations described below.

In the olefin polymerization with use of the olefin polymerization catalyst as described above, the component (A) may be generally used in a molar amount of $10^{-9}$ to $10^{-1}$ mol, and preferably $10^{-8}$ to $10^{-2}$ mol per 1 liter of the reaction volume.

The component (b-1) may be generally used in an amount such that the molar ratio [(b-1)/M] of the component (b-1) to all the transition metal atoms (M) in the component (A) is in the range of 0.01 to 5,000, and preferably 0.05 to 2,000. The component (b-2) may be generally used in an amount such that the molar ratio [(b-2)/M] of the ionic compound in the component (b-2) to all the transition metal atoms (M) in the component (A) is in the range of 0.01 to 5,000, and preferably 1 to 2,000. The component (b-3) may be generally used in an amount such that the molar ratio [(b-3)/M] of the component (b-3) to all the transition metal atoms (M) in the component (A) is in the range of 1 to 10,000, and preferably 1 to 5,000.

In performing the polymerization reaction, 10 g of a wax is set on a filter and reaction is carried out at a temperature of −20 to +200° C., preferably 50 to 180° C., more preferably 70 to 180° C., and at a pressure of above 0 to not more than 7.8 MPa (80 kgf/cm², gauge pressure), preferably above 0 to not more than 4.9 MPa (50 kgf/cm², gauge pressure).

In the polymerization, ethylene and optionally α-olefins are supplied to the polymerization system in amounts such that the obtainable polyolefin wax has the specific composition as described above. Molecular weight modifiers such as hydrogen may be used in the polymerization.

The polymerization usually results in a polymerization liquid containing the polymer. The polyolefin wax may be obtained by treating the polymerization liquid by common methods.

The polyethylene wax may be in any shapes without limitation, but are usually in the form of pellets or tablets.

[Laminating Resin Compositions]

The laminating resin compositions of the invention contain the polyolefin resin and the polyethylene wax. The composition ratio of the polyolefin resin and the polyethylene wax in the laminating resin composition is not particularly limited as long as properties of the obtainable shaped products are not deteriorated. In an embodiment, the amount of the polyethylene wax is in the range of 0.01 to 10 parts by weight, preferably 0.1 to 8 parts by weight, more preferably 0.3 to 6 parts by weight, and particularly preferably 0.5 to 5 parts by weight based on 100 parts by weight of the polyolefin resin.

When the polyolefin resin and the polyethylene wax are used in the above composition ratio, the obtainable resin composition tends to show great improvement in flowability in the lamination process and a still increased forming speed to provide higher productivity. Furthermore, the obtainable multilayer structure tends to have improved mechanical properties and be free from deterioration in optical characteristics or surface properties inherent to the polypropylene resin forming the laminate layer.

[Other Components]

The laminating resin compositions of the invention may contain additives as required in addition to the polyolefin resins and the polyethylene waxes. Exemplary additives are stabilizers such as antioxidants, UV absorbers and light stabilizers, metal soaps, fillers and flame retardants.

The stabilizers include antioxidants such as hindered phenol compounds, phosphite compounds and thioether compounds; UV absorbers such as benzotriazole compounds and benzophenone compounds; and light stabilizers such as hindered amine compounds.

The metal soaps include stearates such as magnesium stearate, calcium stearate, barium stearate and zinc stearate.

The fillers include calcium carbonate, titanium oxide, barium sulfate, talc, clay and carbon black.

The flame retardants include halogen compounds such as halogenated diphenyl ethers including decabromodiphenyl ether and octabromodiphenyl ether, and halogenated polycarbonates; inorganic compounds such as antimony trioxide, antimony tetroxide, antimony pentoxide, sodium pyroantimonate and aluminum hydroxide; and phosphorus compounds.

The additives further include flame retardant auxiliaries for drip prevention, such as tetrafluoroethylene.

Antimicrobial agents and antifungal agents may be used. Examples of the antimicrobial agents and antifungal agents include organic compounds such as imidazole compounds, thiazole compounds, nitrile compounds, haloalkyl compounds and pyridine compounds; and inorganic substances and inorganic compounds such as silver, silver compounds, zinc compounds, copper compounds and titanium compounds.

Of these, silver and silver compounds that are thermally stable and have high performance are preferable.

The silver compounds include silver complexes and silver salts such as fatty acid silver salts and silver phosphate. Silver and silver compounds used as antimicrobial agents or antifungal agents may be supported on porous structures such as zeolite, silica gel, zirconium phosphate, calcium phosphate, hydrotalcite, hydroxyapatite and calcium silicate.

The additives further include colorants, pigments, plasticizers, anti-aging agents and oils.

The laminating resin composition may contain the additives in an amount of 0 to 100 parts by weight based on 100 parts by weight of the polyolefin resin.

[Substrates]

The substrates to be laminated with the laminating resin composition are not particularly limited. Examples thereof include paper materials, wood materials such as plywoods, metal foils such as aluminum foil and copper foil, cellophanes, woven fabrics, nonwoven fabrics and polymer films. The polymer films include films of olefin polymers such as high-density polyethylene, medium-density polyethylene, low-density polyethylene, ethylene/vinyl acetate copolymer, ethylene/acrylate copolymer, ionomer, polypropylene, poly-1-butene and poly-4-methylpentene-1; vinyl copolymers such as polyvinyl chloride, polyvinylidene chloride, polystyrene, polyacrylate and polyacrylonitrile; polyamides such as nylon 6, nylon 66, nylon 7, nylon 10, nylon 11, nylon 12, nylon 610 and poly-meta-xylylene adipamide; polyesters such as polyethylene terephthalate, polyethylene terephthalate/isophthalate and polybutylene terephthalate; polyvinyl alcohol, ethylene/vinyl alcohol copolymer and polycarbonate.

The films may be used singly, or two or more kinds may be used together. Depending on the kind of the substrate, the film may be stretched.

Examples of the stretched films include monoaxially or biaxially stretched polypropylene films, stretched nylon films, stretched polyethylene terephthalate films and stretched polystyrene films.

The films may be coated with polyvinylidene chloride or polyvinyl alcohol or may be deposited with aluminum, alumina, silica or a mixture of alumina and silica.

In a preferred embodiment, substrates having good compatibility with the laminating resin compositions are used. The multilayer structures according to this preferred embodiment show excellent transparency and mechanical strength and have good adhesion between the substrate and the composition forming the laminate layer.

Preferred substrates are polyolefin resin films. Polypropylene films are more preferable, and biaxially stretched polypropylene films are more preferable.

[Multilayer Structures]

The multilayer structures according to the invention have a substrate layer and a laminate layer. The laminate layer is formed from the laminating resin composition as described above. The laminate layer may be a single layer or a multilayer.

[Processes of Production of Multilayer Structures]

The multilayer structure may be produced by directly extruding the laminating resin composition on the substrate to laminate the same. Alternatively, the laminating resin composition may be first formed into a film and the film may be dry laminated on the substrate. Prior to the lamination of the laminating resin composition on the substrate, the substrate may be coated with an adhesive such as a urethane adhesive or may be treated by flame treatment, ozone treatment or corona discharge treatment. In the case of extrusion lamination, however, the obtainable multilayer structure achieves practical properties even without the above pretreatments with no deterioration in mechanical properties such as bond strength and tear strength.

The laminating resin composition may be extrusion-laminated on the substrate by a process in which the laminating resin composition is molten in a common single-screw or twin-screw extruder and is extruded through a T-die or a ring die under common extrusion conditions on the substrate, and the multilayer structure thus produced is taken up. In a usual embodiment, the materials such as the polyolefin resin and the polyethylene wax are supplied through a hopper and are melt-kneaded in an extruder, and the melt-kneaded product is extruded on the substrate through a die provided at the tip of the extruder and the multilayer structure is cooled with a cooling roll or the like and is wound with a winding apparatus. When the laminating resin composition in the molten state is extruded on the substrate through a die, the resin temperature is preferably in the range of 180 to 320° C. When the laminating resin composition being extruded through a die has a temperature in this range, the obtainable laminate layer is free from deterioration in mechanical properties and optical characteristics inherent to the polyolefin resins such as polypropylenes.

The laminate layer in the multilayer structure may be a single layer or a multilayer. A single-layer laminate layer may be obtained by extrusion through a die as described above. A multilayer laminate layer may be formed by a series of steps in which the laminating resin compositions for forming the respective laminate layers are melt-kneaded in separate extruders and the melt-kneaded products are pressed into a co-extrusion die and are extruded through a slit of the die simultaneously onto the substrate, and the multilayer structure thus produced is cooled with a cooling roll or the like and is wound with a winding apparatus.

The laminating resin composition may be formed into a film by a process in which the laminating resin composition is molten in a common single-screw or twin-screw extruder and is extruded through a T-die or a ring die under common extrusion conditions, and the film thus produced is taken up. In a usual embodiment, the materials such as the polyolefin resin and the polyethylene wax are supplied through a hopper and are melt-kneaded in an extruder, and the melt-kneaded product is extruded through a die provided at the tip of the extruder and the film is cooled with a cooling roll or the like and is wound with a winding apparatus. When the melt-kneaded product is extruded through a die, the temperature of the laminating resin composition is preferably in the range of 180 to 320° C. When the laminating resin composition being extruded through a die has a temperature in this range, the obtainable film is free from deterioration in mechanical properties and optical characteristics inherent to the polyolefin resins such as polypropylenes. The multilayer structures may be manufactured stably by dry laminating the films.

The film produced as above may be a single-layer film or a multilayer film. A single-layer film may be obtained by extrusion through a die as described above. A multilayer film may be formed by a series of steps in which the laminating resin compositions for forming the respective films are melt-kneaded in separate extruders and the melt-kneaded products are pressed into a co-extrusion die and are extruded through a slit of the die simultaneously, and the multilayer film thus produced is cooled with a cooling roll or the like and is wound with a winding apparatus.

The materials such as the polypropylene resin and the polyethylene wax may be supplied to the extruder by any methods without limitation. In an embodiment, the polypropylene resin and the polyethylene wax may be separately supplied to the extruder directly. In another embodiment, the polypropylene resin and the polyethylene wax may be dry blended and the blend may be supplied to the extruder. Alternatively, the polypropylene resin and the polyethylene wax may be melt-kneaded beforehand to form a masterbatch and the masterbatch may be supplied to the extruder. In a still another embodiment, the polypropylene resin and the polyethylene wax may be masterbatched with additives such as stabilizers, foaming agents and pigments, and the masterbatch may be supplied to the extruder. The dry blending apparatuses include high-speed mixers such as Henschel mixers, and tumbling mixers. The melt-kneading apparatuses include Plastomill, kneaders, roll mixers, Banbury mixers, Brabender mixers, single-screw extruders and twin-screw extruders.

EXAMPLES

The present invention will be described in detail by presenting examples without limiting the scope of the invention.

Properties of polypropylene were measured as follows.

(MFR)

MFR was measured at 230° C. under 2.16 kg load in accordance with ASTM D-1238.

(Density)

The density was measured by a density gradient method according to JIS K 7112.

Properties of low-density polyethylene were measured as follows.

(MFR)

MFR was measured at 190° C. under 2.16 kg load in accordance with ASTM D-1238.

(Density)

The density was measured by a density gradient method according to JIS K 7112.

Properties of amorphous α-olefin copolymer were measured as follows.

(MFR)

MFR was measured at 230° C. under 2.16 kg load in accordance with ASTM D-1238.

(Density)

The density was measured by a density gradient method according to JIS K 7112.

Properties of polyethylene waxes were measured as follows.

(Number Average Molecular Weight (Mn))

The number average molecular weight (Mn) was determined by GPC under the following conditions. A calibration curve was prepared using commercially available monodisperse polystyrene standards, and the number average molecular weight (Mn) was obtained by a conversion method as described below.

Chromatograph: Gel permeation chromatograph Alliance GPC 2000 (manufactured by Waters)

Solvent: o-dichlorobenzene

Columns: two TSK gel $GMH_6$-HT columns+two TSK gel $GMH_6$-HTL columns (each manufactured by TOSOH CORPORATION)

Flow rate: 1.0 ml/min

Sample: 0.15 mg/ml o-dichlorobenzene solution

Injection amount: 500 μl

Detector: differential refractometer

Temperature: 140° C.

Molecular weight conversion: in terms of PE/general calibration method

In the general calibration method, the following Mark-Houwink coefficients were used:

Coefficient for polystyrene(PS):$KPS=1.38\times10^{-4}$, $aPS=0.70$

Coefficient for polyethylene(PE):$KPE=5.06\times10^{-4}$, $aPE=0.70$ (Density)

The density was measured by a density gradient method according to JIS K 7112.

(Melt Viscosity)

The melt viscosity was measured with a Brookfield viscometer at 140° C.

(Content A and Content B)

Based on the GPC results, the proportion of components having a molecular weight of not more than 1,000 was determined in wt % as the content A. Based on the GPC results, the proportion of components having a molecular weight of not less than 20,000 was determined in wt % as the content B.

(Melting Point)

The melting point was determined using a differential scanning calorimeter (DSC) [DSC-20 (manufactured by Seiko Instruments Inc.)]. The sample was heated to 200° C., held at the temperature for 5 minutes and cooled to room temperature. The sample weighing approximately 10 mg was analyzed by DSC from −20° C. to 200° C. at a temperature increasing rate of 10° C./min The temperature which showed an endothermic peak in the differential scanning calorimetry curve was obtained as the melting point.

(Crystallization Temperature)

The crystallization temperature (Tc) was measured at a temperature decreasing rate of 2° C./min in accordance with ASTM D 3417-75.

(Preparation of Polyolefin Resin)

A polypropylene (MFR: 25 g/10 min, ethylene content: 3 mol %, 1-butene content: 2 mol %), a low-density polyethylene (an ethylene homopolymer, MFR: 10 g/10 min, density: 920 kg/m$^3$) and an amorphous ethylene/propylene copolymer (MFR: 2 g/10 min, propylene content: 20 mol %, density: 870 kg/m$^3$) were mixed in a ratio of 85/10/5 parts by mass. Further, tetrakis[methylene-3(3,5-di-t-butyl-4-hydroxyphenyl) propionate]methane and calcium stearate were added in amounts of 500 ppm and 1000 ppm, respectively, based on the whole resin composition. The mixture was kneaded in a single-screw extruder and was pelletized.

(Synthesis of Polyethylene Wax (1))

A polyethylene wax (1) was synthesized using a metallocene catalyst as described below.

A 2 L stainless steel autoclave that had been thoroughly purged with nitrogen and been maintained at 25° C. was charged with 770 ml of hexane and 115 g of propylene. The temperature in the system was increased to 150° C. and polymerization was initiated by injecting 0.3 mmol of triisobutylaluminum, 0.04 mmol of dimethylanilinium tetrakis(pentafluorophenyl)borate and 0.0005 mmol of bis(cyclopentadienyl)zirconium dichloride with ethylene. The total pressure was maintained at 3.0 MPa (gauge pressure) by continuously supplying ethylene, and the polymerization was carried out at 155° C. for 30 minutes.

The polymerization was terminated by adding a small amount of ethanol to the system. Unreacted ethylene was purged off. The polymer solution was dried at 100° C. under reduced pressure overnight to give 46 g of a polyethylene wax (1). The polyethylene wax (1) had a number average molecular weight (Mn) of 800, a weight average molecular weight (Mw) of 1,500, a density of 897 kg/m$^3$, a melt viscosity of 40 mPa·s, a content A of 23.5 wt %, a content B of 0.01 wt %, and a melting point of 78.8° C. The results are shown in Table 1.

(Synthesis of Polyethylene Wax (2))

A polyethylene wax (2) was synthesized using a metallocene catalyst as described below.

A 2 L stainless steel autoclave that had been thoroughly purged with nitrogen and been maintained at 25° C. was charged with 930 ml of hexane and 35 g of propylene. The temperature in the system was increased to 150° C. and polymerization was initiated by injecting 0.3 mmol of triisobutylaluminum, 0.04 mmol of dimethylanilinium tetrakis(pentafluorophenyl)borate and 0.0005 mmol of bis(cyclopentadienyl)zirconium dichloride with ethylene. The total pressure was maintained at 3.0 MPa (gauge pressure) by continuously supplying ethylene, and the polymerization was carried out at 155° C. for 30 minutes.

The polymerization was terminated by adding a small amount of ethanol to the system. Unreacted ethylene was purged off. The polymer solution was dried at 100° C. under reduced pressure overnight to give 40 g of a polyethylene wax (2). The polyethylene wax (2) had a number average molecular weight (Mn) of 1,300, a weight average molecular weight (Mw) of 3,300, a density of 948 kg/m$^3$, a melt viscosity of 90 mPa·s, a content A of 19.8 wt %, a content B of 0.3 wt %, and a melting point of 115.4° C. The results are shown in Table 1.

(Synthesis of Polyethylene Wax (3))

A polyethylene wax (3) was synthesized using a metallocene catalyst as described below.

A 2 L stainless steel autoclave that had been thoroughly purged with nitrogen and been maintained at 25° C. was charged with 920 ml of hexane and 50 g of propylene. The temperature in the system was increased to 150° C. and polymerization was initiated by injecting 0.3 mmol of triisobutylaluminum, 0.04 mmol of dimethylanilinium tetrakis(pentafluorophenyl)borate and 0.0002 mmol of bis(cyclopentadienyl)zirconium dichloride with ethylene. The total pressure was maintained at 3.0 MPa (gauge pressure) by continuously supplying ethylene, and the polymerization was carried out at 150° C. for 30 minutes.

The polymerization was terminated by adding a small amount of ethanol to the system. Unreacted ethylene was purged off. The polymer solution was dried at 100° C. under reduced pressure overnight to give 40 g of a polyethylene wax (2). The polyethylene wax (3) had a number average molecular weight (Mn) of 3,000, a weight average molecular weight (Mw) of 8,200, a density of 932 kg/m$^3$, a melt viscosity of 1,000 mPa·s, a content A of 4.6 wt %, a content B of 6.7 wt %, and a melting point of 105.0° C. The results are shown in Table 1.

The properties of the polyethylene waxes are set forth in Table 1.

(Peel Strength)

The lamination films obtained by the lamination process were aged at 40° C. for 24 hours and were stabilized at room temperature. The films were then tested in accordance with JIS K 6854-3 at a head speed of 300 ram/min to determine the T-peel strength (N/15 mm).

(Tear Strength)

The lamination films obtained by the lamination process were aged at 40° C. for 24 hours and were stabilized at room temperature. The films were then notched in 20 mm and tested for tear strength (N) in accordance with JIS L 7128-2.

(Haze)

The haze (%) of the lamination films was measured in accordance with JIS K 7105.

(Slip Properties)

The lamination films were brought into contact with each other through the laminate layers. A load of 205 g was applied to an area of 64×64 mm, and the dynamic friction coefficient was measured at a testing speed of 200 mm/min.

Example 1

100 Parts by mass of the polyolefin resin and 3 parts by mass of a polyethylene wax (EXCEREX 30200BT manufactured by Mitsui Chemicals, Inc.) were mixed together and were supplied to a 65 mm-diameter single-screw extruder. The mixture was melt-kneaded at a resin temperature of 270° C. and was extruded through a T-die on a biaxially stretched polypropylene film substrate at a line speed of 70 m/min, a thickness of 20 μm and a width of 620 mm, thereby producing a lamination film. The properties of the film were measured, the results being set forth in Table 2.

Example 2

A lamination film was produced in the same manner as in Example 1, except that the polyethylene wax was replaced by the polyethylene wax (1). The results are set forth in Table 2.

Example 3

A lamination film was produced in the same manner as in Example 1, except that the polyethylene wax was replaced by the polyethylene wax (2). The results are set forth in Table 2.

TABLE 1

Properties of polyolefin waxes

| | Mn | Mw | Density (kg/m$^3$) | Melt viscosity K (mPa·s) | Content A (wt %) | Content B (wt %) | 230 × K$^{-0.537}$ | 0.0075 × K | DSC melting point (° C.) | Crystallization temperature (° C.) | Left-hand side of Equation (III) |
|---|---|---|---|---|---|---|---|---|---|---|---|
| 30200BT | 2000 | 5000 | 913 | 300 | 9.3 | 2.2 | 10.8 | 2.3 | 98.2 | 86.6 | 91.41 |
| Polyethylene wax (1) | 800 | 1500 | 897 | 40 | 23.5 | 0.01 | 31.7 | 0.3 | 78.8 | 62.9 | 83.40 |
| Polyethylene wax (2) | 1300 | 3300 | 948 | 90 | 19.8 | 0.3 | 20.5 | 0.7 | 115.4 | 106.3 | 108.95 |
| Polyethylene wax (3) | 3000 | 8200 | 932 | 1000 | 4.6 | 6.7 | 5.6 | 7.5 | 105.0 | 95.2 | 100.93 |
| 420P | 2000 | 6400 | 930 | 700 | 8.3 | 6.2 | 6.8 | 5.3 | 112.3 | 1018 | 99.93 |
| 48070BT | 3400 | 9000 | 902 | 1350 | 4.7 | 8.7 | 4.8 | 10.1 | 89.5 | 83.8 | 85.90 |
| 40800T | 2400 | 7000 | 980 | 600 | 7.3 | 4.2 | 7.4 | 4.5 | 127.7 | 116.2 | 124.98 |
| 10500 | 700 | 1300 | 960 | 18 | 47.8 | 0 | 48.7 | 0.1 | 119.6 | 108.1 | 114.96 |

In Examples below, productivity and properties of lamination films were measured by the following methods.

(Productivity)

The productivity was evaluated based on load power (A) and resin pressure (MPa) in the lamination process.

Example 4

A lamination film was produced in the same manner as in Example 1, except that the polyethylene wax (EXCEREX 30200BT manufactured by Mitsui Chemicals, Inc.) was used in 1 part by mass. The results are set forth in Table 2.

Example 5

A lamination film was produced in the same manner as in Example 1, except that the polyethylene wax (EXCEREX 30200BT manufactured by Mitsui Chemicals, Inc.) was used in 5 parts by mass. The results are set forth in Table 2.

Example 6

A lamination film was produced in the same manner as in Example 1, except that the polyethylene wax was replaced by polyethylene wax (HI-WAX 420P manufactured by Mitsui Chemicals, Inc.). The results are set forth in Table 2.

Comparative Example 1

The polyolefin resin was supplied to a 65 mm-diameter single-screw extruder. The resin was melt-kneaded at a resin temperature of 270° C. and was extruded through a T-die on a biaxially stretched polypropylene film substrate at a line speed of 70 m/min, a thickness of 20 μm and a width of 620 mm, thereby producing a lamination film. The load power and the resin pressure were high compared to Examples 1 to 6, indicating deteriorated productivity. The film was tested to show low peel strength and low tear strength. The results are set forth in Table 2.

Comparative Example 2

A lamination film was produced in the same manner as in Example 1, except that the polyethylene wax was replaced by the polyethylene wax (3). The peel strength was low compared to Examples 1 to 6. The results are set forth in Table 2.

Comparative Example 3

A lamination film was produced in the same manner as in Example 1, except that the polyethylene wax was replaced by polyethylene wax (EXCEREX 48070BT manufactured by Mitsui Chemicals, Inc.). The peel strength was low compared to Examples 1 to 6. The results are set forth in Table 2.

Comparative Example 4

A lamination film was produced in the same manner as in Example 1, except that the polyethylene wax was replaced by polyethylene wax (EXCEREX 40800T manufactured by Mitsui Chemicals, Inc.). The peel strength was low compared to Examples 1 to 6. The results are set forth in Table 2.

Comparative Example 5

A lamination film was produced in the same manner as in Example 1, except that the polyethylene wax was replaced by polyethylene wax (EXCEREX 10500 manufactured by Mitsui Chemicals, Inc.). The peel strength was low compared to Examples 1 to 6. The results are set forth in Table 2.

Comparative Example 6

A lamination film was produced in the same manner as in Example 1, except that the polyethylene wax was replaced by 0.5 part by mass of calcium stearate. The load power and the resin pressure were high compared to Examples 1 to 6, and the haze was increased. The results are set forth in Table 2.

TABLE 2

Lamination process results

| | | Ex. 1 | Ex. 2 | Ex. 3 | Ex. 4 | Ex. 5 | Ex. 6 |
|---|---|---|---|---|---|---|---|
| Polyethylene wax | Kind | 30200BT | Polyethylene wax (1) | Polyethylene wax (2) | 30200BT | 30200BT | 420P |
| | Parts by mass | 3 | 3 | 3 | 1 | 5 | 3 |
| Load power (A) | | 41 | 40 | 40 | 46 | 36 | 42 |
| Resin pressure (MPa) | | 8.8 | 8.7 | 8.7 | 10.1 | 8.1 | 9.4 |
| Peel strength (N/15 mm) | | 0.97 | 0.99 | 0.89 | 0.89 | 0.87 | 0.94 |
| Tear strength (N) | | 1.41 | 1.15 | 1.09 | 1.11 | 1.67 | 0.96 |
| Haze (%) | | 9.8 | 9.6 | 9.9 | 9.9 | 9.9 | 10.2 |
| Slip properties | | 0.12 | 0.12 | 0.11 | 0.13 | 0.10 | 0.13 |

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Polyethylene wax | Kind | | Polyethylene wax (3) | 48070BT | 40800T | 10500 | Calcium stearate |
| | Parts by mass | | 3 | 3 | 3 | 3 | 0.5 |
| Load power (A) | | 51 | 46 | 45 | 47 | 39 | 51 |
| Resin pressure (MPa) | | 10.3 | 9.7 | 9.6 | 9.7 | 8.6 | 10.5 |
| Peel strength (N/15 mm) | | 0.74 | 0.73 | 0.75 | 0.66 | 0.76 | 0.95 |
| Tear strength (N) | | 0.92 | 1.98 | 2.28 | 1.87 | 0.89 | 0.95 |
| Haze (%) | | 9.7 | 10.4 | 10.0 | 10.8 | 10.1 | 11.2 |
| Slip properties | | 0.14 | 0.10 | 0.11 | 0.10 | 0.09 | 0.12 |

INDUSTRIAL APPLICABILITY

The laminating resin compositions of the invention enable excellent productivity in the lamination processes, and are free from deterioration in optical characteristics such as transparency or surface properties inherent to resins such as polypropylenes. The multilayer structures obtained by laminating the composition on a substrate have tear strength which is as high as that of multilayer structures obtained by simply laminating a polyolefin resin such as polypropylene on a substrate. The laminating resin compositions are thus suitably used to form laminate layers on substrates.

The invention claimed is:

1. A laminating resin composition which comprises a polyolefin resin and a polyethylene wax having a density in the range of 890 to 955 kg/m$^3$ as measured by a density gradient tube method in accordance with JIS K 7112 and a number average molecular weight (Mn) in terms of polyethylene in the range of 500 to 2900 as measured by gel permeation chromatography (GPC), wherein the polyolefin resin comprises a polypropylene that is a random copolymer of propylene and an α-olefin other than propylene, and contains 0.1 to 10 mol % of structural units derived from the α-olefin, wherein the total of all structural units is 100 mol %.

2. The laminating resin composition according to claim 1, wherein the polyolefin resin further comprises at least one resin selected from the group consisting of low-density polyethylenes and amorphous α-olefin copolymers—other than the polypropylenes and the low-density polyethylenes— wherein the low-density polyethylenes have a density in the range of 900 to 940 kg/m$^3$ and a melt flow rate (MFR) in the range of 3 to 12 g/10 min as measured at 190° C. under 2.16 kg load in accordance with ASTM D-1238.

3. The laminating resin composition according to claim 2, wherein the amorphous α-olefin copolymers contain structural units derived from ethylene and structural units derived from a α-olefin of 3 to 10 carbon atoms, and have a content of the ethylene-derived structural units ranging from 75 to 95 mol %—wherein the total of all structural units is 100 mol %—and a density of 850 to 890 kg/m$^3$.

4. The laminating resin composition according to claim 2, wherein the amorphous α-olefin copolymers contain structural units derived from propylene and structural units derived from an α-olefin of 2 or 4 to 10 carbon atoms, and have a content of the propylene-derived structural units ranging from 70 to less than 90 mol %—wherein the total of all structural units is 100 mol %.

5. The laminating resin composition according to claim 1, wherein the resin composition contains the polyethylene wax at 0.01 to 10 parts by weight based on 100 parts by weight of the polyolefin resin.

6. The laminating resin composition according to claim 1, wherein the polyethylene wax satisfies the relation expressed by Equation (I) below:

$$A \leq 230 \times K^{(-0.537)} \tag{I}$$

wherein A is the content (wt %) of a component in the polyethylene wax which has a molecular weight in terms of polyethylene of not more than 1,000 as measured by gel permeation chromatography, and K is the melt viscosity (mPa·s) of the polyethylene wax at 140° C.

7. The laminating resin composition according to claim 1, wherein the polyethylene wax satisfies the relation expressed by Equation (II) below:

$$B \leq 0.0075 \times K \tag{II}$$

wherein B is the content (%) of a component in the polyethylene wax which has a molecular weight in terms of polyethylene of not less than 20,000 as measured by gel permeation chromatography, and K is the melt viscosity (mPa·s) of the polyethylene wax at 140° C.

8. A multilayer structure which comprises a layer comprising a substrate and a laminate layer comprising the resin composition of claim 1.

9. The laminating resin composition according to claim 2, wherein the polypropylene accounts for 75 to 95 wt % and the at least one resin selected from the low-density polyethylenes and the amorphous α-olefin copolymers accounts for 5 to 25 wt % relative to 100 wt % of the polyolefin resins.

10. The multilayer structure according to claim 8, wherein the laminate layer is formed by extrusion-lamination.

* * * * *